March 25, 1924.
C. GIRL
SIDE BUMPER FOR AUTOMOBILES
Filed July 19, 1923
1,488,110
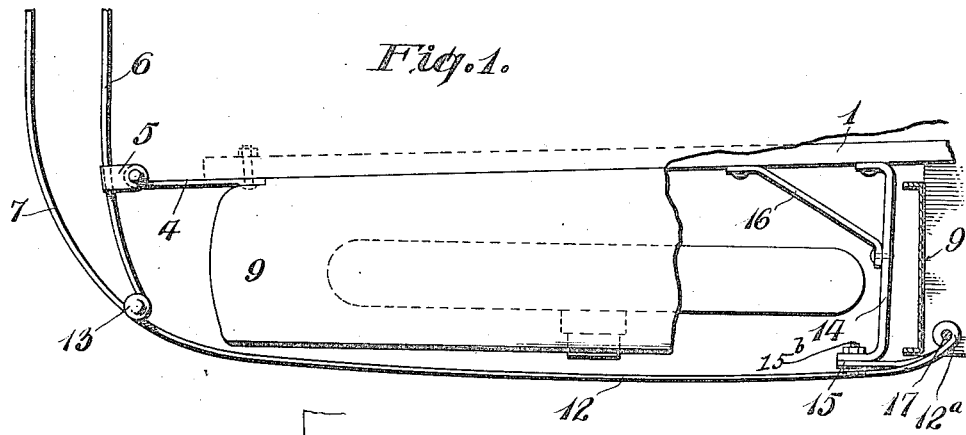
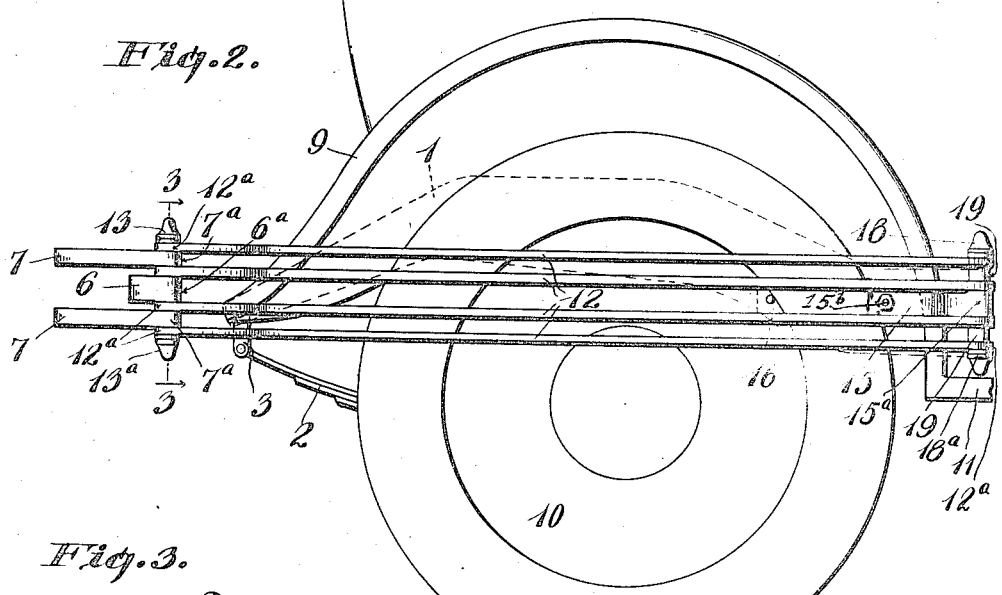
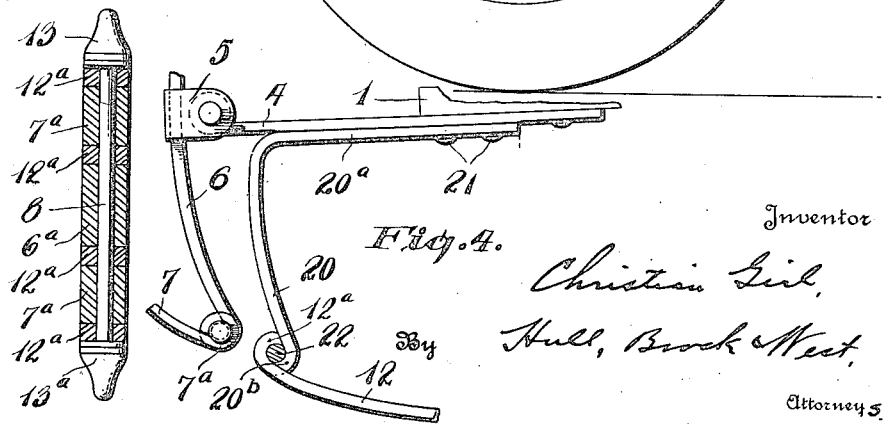
Inventor
Christian Girl,
By Hull, Brock & West,
Attorneys Patented Mar. 25, 1924.

1,488,110

UNITED STATES PATENT OFFICE.

CHRISTIAN GIRL, OF KALAMAZOO, MICHIGAN.

SIDE BUMPER FOR AUTOMOBILES.

Application filed July 19, 1923. Serial No. 652,523.

*To all whom it may concern:*

Be it known that I, CHRISTIAN GIRL, a citizen of the United States, residing at Kalamazoo, in the county of Kalamazoo and State of Michigan, have invented a certain new and useful Improvement in Side Bumpers for Automobiles, of which the following is a full, clear, and exact description, reference being had to the accompanying drawings.

This invention relates to bumpers for automobiles, and more particularly to bumpers employed for the purpose of guarding or protecting the fenders and wheels of such vehicles.

It is the general purpose and object of the invention to provide a bumper of this character which is capable of performing its functions in a most efficient manner; which can be conveniently swung out of the way, when occasion requires, to afford access to the wheel or fender with which it is associated; also, more limitedly, to improve the manner of construction and supporting bumpers of this character.

Further and more limited objects of the invention will appear in the specification; and the objects, both general and limited will be realized through the combination of elements set forth in the claims.

In the drawings, Fig. 1 represents a plan view, with certain parts broken way, of the rear end of one side of an automobile having my invention applied thereto;

Fig. 2, a side elevation of the parts shown in Fig. 1;

Fig. 3, a sectional detail corresponding to the line 3—3 of Fig. 2; and

Fig. 4, a fragmentary detail of the parts illustrated in Fig. 1, and showing a modified manner of supporting one end of my bumper.

Describing by reference characters the various parts illustrated in the drawings, 1 denotes one of the side sills or members of an automobile, the part of such member shown therein being the rear part and being bent upwardly and then downwardly to accommodate the rear axle and the spring-suspension. 2 denotes the rear spring, suspended from the rear end of the frame member by the usual shackles 3. Secured to the rear end of the side member 1 is an arm 4 having an eye at its rear end to which a clamp 5 is pivoted, the said clamp being secured to the forwardly positioned bar 6 of a rear bumper having two impact bars 7 parallel with each other and positioned one above and the other below the bar 6. The ends of the bars 6 and 7 are provided with the eyes $6^a$ and $7^a$ (see Figs. 2 and 3) and are connected by means of a bolt 8 at each end of the bumper and extending through the aligned eyes.

The bumper just described is preferably of a type shown, described, and claimed in the patent to A. L. McGregor, 1,372,154, March 22, 1921.

9 denotes generally the rear fender and 10 the rear wheel. The front end of the fender is supported in the usual manner from the running board 11 and its rear end is protected against injury from the rear by means of the bumper just described.

In order to protect the sides of the fender and the rear wheel from injury by vehicles or other objects, I provide the side guard bumper shown herein. This bumper preferably comprises a plurality of parallel, vertically spaced bars 12. These bars may be of any shape in cross section, those shown herein being approximately square. Each of the bars 12 is provided with an eye $12^a$ at each end thereof, and the eyes at the rear ends of the bars are arranged to receive the bolt 8, the eyes on the two intermediate bars 12 serving as spacers between the middle bar 6 and the top and bottom bars 7 of the rear bumper, while the eyes on the top and bottom bars 12 serve as spacing washers for the ornamental head 13 and nut $13^a$ on the opposite ends of the bolt.

The bars 12 are shown as slightly convex outwardly, thereby to clear the ends of the fender 9 and still enable the ends of the bars to overhang inwardly both ends of the fender.

With the construction of frame, fender, and running board shown herein, I employ a special type of support for the front end of my side guard or bumper. This is shown more particularly in Figs. 1 and 2 and comprises a channeled bar 14 which is secured by one of its flanges to the side member 1 and which has secured to its opposite flange a short, forwardly projecting curved arm 15, the arm 15 extending around and in front of the front end of the fender 9 and having an eye $15^a$ at its front end. The bar 14 is braced by means of a strut bar 16 having its rear end secured to the side member 1 and its front end riveted or otherwise suitably secured to the middle portion of the bar 14. A bolt 15$^b$ removably secures the arm 15 to the bar 14.

The front ends of the bars 12 are also provided with eyes 12$^a$ adapted to receive a bolt 17, similar to the bolt 8, and having the ornamental head 18 and ornamental nut 18$^a$ at the opposite ends thereof.

The bar 15 will be of the same width as the bar 6, so that the front ends of the intermediate bars 12 will be spaced equidistantly with the rear ends thereof, while spacing sleeves 19 of a width equal to that of the eyes 7$^a$, between the intermediate bars and the top and bottom bars will maintain this equidistantly spaced relation between all of the bars 12 throughout their length.

Where a rear bumper of the kind shown and described is employed, it will be evident that it affords, with my side bumper, a very convenient and efficient manner of mounting the adjacent ends of both bumpers as well as a means for mounting the said bumpers in a manner which will enable them to be quickly and readily disconnected, if desired, and which will enable a side bumper to be swung about either end as a hinge, thereby to permit convenient access to the rear fender and wheel.

Except under unusual circumstances, the fender guard bumper, mounted as heretofore described, will be swung about its rear pivot as such action will not necessitate dissembling the adjacent end of the rear bumper.

In Fig. 4 I have shown a modification of the invention wherein, instead of using the rear bumper as a support for the rear end of the side, or fender-guard, bumper, the latter bumper has its rear end supported by means of a special arm comprising an outwardly extending portion 20 and a rearwardly extending portion 20$^a$, secured to the side member 1, as by means of bolts or rivets 21 extending through such portion and through the supporting arm 4 for the rear bumper.

The outer end of the part 20 is provided with an eye 20$^b$ which is adapted to be interposed between the eyes on the rear ends of the two intermediate bars 12 in the same manner that the eye 15$^a$ is interposed between the eyes at the front ends of said bars. In other words, the rear end of the side, or fender-guard, bumper will be supported by the arm 20 and eye 20$^b$ in precisely the same manner as the front end is supported by the bar 15 and eye 15$^a$. The rear bolt is indicated at 22.

The construction shown in Fig. 4 enables the side bumper to be disconnected with equal convenience at either end and to be swung about the other end as a pivot. In both forms of my invention, the side bumper is of such construction as to provide a most efficient guard for the rear wheel and fender with which it is associated; it can be quickly and conveniently assembled in operative relation to the parts with which it is associated; and it can be quickly and conveniently dissembled and swung about an end as a pivot to permit convenient access to the wheel and fender, if desired. In both cases, when it is desirable to swing the side bumper about its rear pivot, this action can be quickly and conveniently accomplished by removing the bolt 18 which will allow the bars 12 to be swung about their rear pivot; or the bolt 15$^b$ may be removed, which will enable the bars to be swung about this pivot but with their front ends connected by the front end of the arm 15 and the bolt 18.

Having thus described my invention, what I claim is:

1. The combination, with a bumper adapted to extend across the side of a wheel and fender of an automobile, of means pivotally supporting each end of said bumper, whereby it may be swung about either end to permit access to the fender or wheel.

2. The combination, with a bumper adapted to extend across the side of a wheel and fender of an automobile, of means supporting each end of said bumper, one of such means being a pivotal support whereby the bumper may be swung about such end to permit access to the fender or wheel.

3. The combination, with a side member, wheel, and fender of an automobile, of a side bumper adapted to extend across said wheel and fender, and means carried by the side member for pivotally supporting the ends of the said bumper.

4. The combination, with a side member, wheel, and fender of an automobile, of a side bumper adapted to extend across said wheel and fender, and means carried by the side member for movably supporting the ends of the said bumper.

5. The combination, with a side member, wheel, and fender of an automobile, of a side bumper comprising a plurality of substantially parallel vertically spaced bars, each adapted to extend across the said wheel and fender, and means carried by the said member for pivotally supporting the ends of said bumper.

6. The combination, with a side member, wheel, and fender of an automobile, of a side bumper comprising a plurality of substantially parallel vertically spaced bars, each adapted to extend across the said wheel and fender, and means carried by the said member for supporting the ends of said bumper.

7. The combination, with a side member, wheel, and fender of an automobile, of a side bumper comprising a plurality of substantially parallel vertically spaced bars, each having an eye at each end thereof, bolts extending through the eyes at opposite ends of said bumper, and means carried by the said side member for supporting the said bolts.

8. The combination, with a side member, fender, and wheel of an automobile, of a bumper comprising a plurality of substantially parallel vertically spaced bars, an arm secured to said side member and projecting beyond one end of said fender, means pivotally supporting one end of the bumper from said arm, and means carried by the side member for supporting the opposite end of the said bumper therefrom.

9. The combination, with a side member, fender, and wheel of an automobile, of an arm secured to the side member and projecting below and outside one end of the said fender, a bumper having one end movably connected to said arm, and means located beyond the opposite end of said fender for movably supporting the opposite end of said bumper.

10. The combination, with a fender and wheel of an automobile, of a bumper for one end of said automobile having one end adjacent to said fender, a side bumper for said fender and wheel having one end movably connected to such end of the first bumper, and means movably supporting the opposite end of said side bumper.

11. The combination, with a side member, fender and wheel of an automobile, of a bumper for one end of said automobile having one end adjacent to said fender, a side bumper for said fender and wheel having one end supported by the first-mentioned bumper and means carried by the side member for supporting the opposite end of said side bumper.

12. The combination, with a fender, and wheel of an automobile, of a bumper comprising a plurality of bars or plates each having vertically-spaced aligned eyes adjacent to said fender, a side bumper comprising a plurality of substantially parallel, vertically spaced bars each having an eye at an end thereof, such eyes being aligned and interspaced with the eyes on the first bumper, a bolt extending through the eyes of both bumpers, and means movably supporting the opposite ends of the bars of said side bumper.

13. The combination, with a side member, fender and wheel of an automobile, of a bumper comprising a plurality of bars or plates each having vertically spaced aligned eyes adjacent to said fender, a side bumper comprising a plurality of substantially parallel, vertically spaced bars each having an eye at an end thereof, such eyes being aligned and interspaced with the eyes on the first bumper, a bolt extending through the eyes of both bumpers, and an arm secured to the member and opposite ends of the bars of said side bumper.

14. The combination with a side member, fender, and wheel of an automobile, of a side bumper for said fender and wheel, said bumper comprising a plurality of vertically spaced bars, each having eyes at opposite ends thereof, supporting members supported by the side member and projecting outwardly therefrom at the front and at the rear of the said fender and wheel, bolts extending through the said supporting members and through the eyes at the ends of the side bumper adjacent thereto, and spacing members on said bolts interposed between the eyes of the side bumper bars thereon.

In testimony whereof, I hereunto affix my signature.

CHRISTIAN GIRL.